(12) United States Patent
Miao et al.

(10) Patent No.: US 12,141,661 B2
(45) Date of Patent: Nov. 12, 2024

(54) RAPID MULTI-LEVEL QUBIT RESET

(71) Applicant: Google LLC, Mountain View, CA (US)

(72) Inventors: Kevin Chenghao Miao, Goleta, CA (US); Alexander Korotkov, Riverside, CA (US); Matthew James McEwen, Santa Barbara, CA (US); Rami Barends, San Diego, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/305,152

(22) Filed: Apr. 21, 2023

(65) Prior Publication Data

US 2024/0112059 A1 Apr. 4, 2024

Related U.S. Application Data

(60) Provisional application No. 63/333,882, filed on Apr. 22, 2022.

(51) Int. Cl.
*G06N 10/70* (2022.01)
*G06N 10/40* (2022.01)

(52) U.S. Cl.
CPC ............ *G06N 10/70* (2022.01); *G06N 10/40* (2022.01)

(58) Field of Classification Search
CPC ........ G01N 24/10; G01N 10/70; G06N 10/40; G06F 1/24
See application file for complete search history.

(56) References Cited

U.S. PATENT DOCUMENTS

| | | | |
|---|---|---|---|
| 9,692,423 B2 * | 6/2017 | McDermott, III | H03K 19/1954 |
| 10,217,057 B2 | 2/2019 | Barends | |
| 10,282,675 B2 * | 5/2019 | Bloom | H03K 19/195 |
| 10,535,013 B2 * | 1/2020 | Abdo | H03K 19/195 |
| 11,112,842 B1 * | 9/2021 | Smith | G06N 10/00 |
| 11,183,989 B1 * | 11/2021 | Thorbeck | H03H 11/04 |
| 11,546,448 B2 * | 1/2023 | Entelis | H04L 67/5651 |

(Continued)

FOREIGN PATENT DOCUMENTS

WO WO 2017074379 5/2017

OTHER PUBLICATIONS

Battistel, "Mitigating leakage and noise in superconducting quantum computing" Diss. Delft University of Technology, 2022, 276 pages.

(Continued)

*Primary Examiner* — Esaw T Abraham
(74) *Attorney, Agent, or Firm* — Fish & Richardson P.C.

(57) ABSTRACT

Methods, systems and apparatus for resetting a qubit. In one aspect, an apparatus includes a qubit, wherein the state of the qubit occupies a plurality of levels comprising two computational levels and one or more non-computational levels; a resonator that operates at a resonator frequency; control electronics that control a frequency of the qubit such that during a reset operation the qubit frequency is adjusted from a holding frequency that is lower than the resonator frequency to an idling frequency that is higher than the resonator frequency, and during the adjustment a first derivative of the qubit frequency at a first time is positive, at a second time that occurs after the first time is zero, and at a third time that occurs after the second time is positive, where the qubit frequency achieves the idling frequency at a fourth time that occurs after the third time.

25 Claims, 12 Drawing Sheets

(56) References Cited

U.S. PATENT DOCUMENTS

| | | | |
|---|---|---|---|
| 11,586,448 B2 * | 2/2023 | Lauer | G06N 10/00 |
| 11,664,570 B2 * | 5/2023 | Underwood | H01P 5/16 |
| | | | 327/527 |
| 11,847,534 B2 * | 12/2023 | Whittaker | H03F 19/00 |
| 2020/0250569 A1 | 8/2020 | Kelly | |

OTHER PUBLICATIONS

International Search Report and Written Opinion in International Appln. No. PCT/US2023/019412, mailed on Jun. 28, 2023, 17 pages.

Magnard et al., "Fast and unconditional all-microwave reset of a superconducting qubit." Physical review letters 121.6, 060502, Aug. 2018, 6 pages.

McEwen et al., "Removing leakage-induced correlated errors in superconducting quantum error correction" Nature Communications, 12.1, 1761, Mar. 2021, 7 pages.

Zhou et al., "Rapid and unconditional parametric reset protocol for tunable superconducting qubits." Nature Communications 12.1, 5924, Oct. 2021, 8 pages.

\* cited by examiner

RAPID MULTI-LEVEL QUBIT RESET

CROSS-REFERENCE TO RELATED APPLICATIONS

This application claims the benefit under 35 U.S.C. § 119(e) of U.S. Patent Application No. 63/333,882, filed Apr. 22, 2022. The disclosure of the foregoing application is incorporated herein by reference in its entirety for all purposes.

BACKGROUND

This specification relates to quantum computing.

Classical computers have memories made up of bits, where each bit can represent either a zero or a one. Quantum computers maintain sequences of quantum bits, called qubits, where each quantum bit can represent a zero, one, or any quantum superposition of zeros and ones. Quantum computers operate by setting qubits in an initial state and controlling the qubits, e.g., according to a sequence of quantum computing operations such as single-qubit gates, entangling gates, and measurement. These quantum computing operations can cause the qubit to populate non-computational levels, creating a demand for a reset protocol that can remove leakage population from these higher states without adversely impacting performance.

SUMMARY

This specification describes technologies for performing rapid multi-level qubit reset.

In general, one innovative aspect of the subject matter described in this specification can be implemented in a method for resetting a qubit, the method including controlling, by a quantum computing system, an operating frequency of a qubit, wherein i) the qubit is coupled to a resonator operating at a resonator frequency and ii) the state of the qubit occupies at least one of a plurality of levels, the plurality of levels comprising two computational levels and one or more non-computational levels that are each higher in energy than the computational levels, the controlling comprising, during a reset operation: adjusting the operating frequency of the qubit from a holding frequency to an idling frequency, wherein i) the holding frequency is lower than the resonator frequency and the idling frequency is higher than the resonator frequency, and ii) a first derivative of the qubit operating frequency at a first time during the adjustment is positive, and at a second time during the adjustment that occurs after the first time is zero, and at a third time during the adjustment that occurs after the second time is positive, and wherein the operating frequency of the qubit achieves the idling frequency at a fourth time that occurs after the third time.

Other implementations of this aspect include corresponding classical or quantum computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations adjusting the operating frequency of the qubit causes destructive interference between the qubit and resonator.

In some implementations a first derivative of the qubit operating frequency at a fifth time during the adjustment is negative, wherein the fifth time occurs after the second time and before the third time.

In some implementations a first derivative of the qubit operating frequency at a sixth time during the adjustment is zero, wherein the sixth time occurs after the fifth time and before the third time.

In some implementations the adjustment of the operating frequency of the qubit is defined by two tunable parameters from a set of multiple parameters.

In some implementations the set of multiple parameters comprises a first parameter that represents a value of the operating frequency of the qubit at the second time, wherein the value of the first parameter is greater than or equal to the resonator frequency and less than or equal to the idling frequency.

In some implementations the set of multiple parameters comprises a second parameter that represents a value of the operating frequency of the qubit at the sixth time, wherein the value of the second parameter is greater than or equal to the holding frequency and less than the idling frequency.

In some implementations the set of multiple parameters comprises a third parameter that represents a duration between the second time and the fourth time.

In some implementations the set of multiple parameters comprises a fourth parameter that represents a smoothness of the adjustment of the qubit operating frequency between one or more of i) the second time and the sixth time or ii) the sixth time and the fourth time.

In some implementations controlling further comprises, during the reset operation: adiabatically adjusting the qubit operating frequency from i) a current operating frequency to ii) the holding frequency to transfer qubit excitations to the resonator; and holding the qubit operating frequency at the holding frequency such that resonator excitations decay.

In some implementations, prior to the reset operation the qubit occupies a non-computational level and after the reset operation the qubit occupies a ground state included in the two computational levels.

In some implementations the method further comprises repeatedly performing the reset operation after each of multiple rounds of quantum error correction.

In some implementations the method further comprises calibrating the adjustment of the qubit operating frequency with respect to a first tunable parameter and a second tunable parameter, the calibrating comprising: performing a first set of qubit reset operations, wherein each qubit reset operation in the first set corresponds to respective values of the first tunable parameter and the second tunable parameter; identifying, based on reset errors corresponding to the first set of qubit reset operations, an initial value of the first tunable parameter and an initial value of the second tunable parameter; performing a second set of qubit reset operations, wherein each qubit reset operation in the second set corresponds to respective values of the first tunable parameter and the second tunable parameter that are within a predetermined distance from the initial value of the first tunable parameter and the initial value of the second tunable parameter; and identifying, based on reset errors corresponding to the second set of qubit reset operations, an optimal value of the first tunable parameter and an optimal value of the second tunable parameter.

In general, one innovative aspect of the subject matter described in this specification can be implemented in an apparatus that includes: a qubit, wherein the state of the qubit occupies at least one of a plurality of levels, the plurality of levels comprising two computational levels and one or more non-computational levels that are each higher than the computational levels; a resonator, wherein the resonator operates at a resonator frequency; a control electronics configured to control an operating frequency of the qubit such that during a reset operation the operating frequency of the qubit is adjusted from a holding frequency to an idling frequency, wherein the holding frequency is lower than the resonator frequency and the idling frequency is higher than the resonator frequency, and a first derivative of the qubit operating frequency at a first time during the adjustment is positive, and at a second time during the adjustment that occurs after the first time is zero, and at a third time during the adjustment that occurs after the second time is positive, and wherein the operating frequency of the qubit achieves the idling frequency at a fourth time that occurs after the third time.

The foregoing and other implementations can each optionally include one or more of the following features, alone or in combination. In some implementations adjusting the operating frequency of the qubit causes destructive interference between the qubit and resonator.

In some implementations a first derivative of the qubit operating frequency at a fifth time during the adjustment is negative, wherein the fifth time occurs after the second time and before the third time.

In some implementations a first derivative of the qubit operating frequency at a sixth time during the adjustment is zero, wherein the sixth time occurs after the fifth time and before the third time.

In some implementations the adjustment of the operating frequency of the qubit is defined by two tunable parameters from a set of multiple parameters.

In some implementations the set of multiple parameters comprises a first parameter that represents a value of the operating frequency of the qubit at the second time, wherein the value of the first parameter is greater than or equal to the resonator frequency and less than or equal to the idling frequency.

In some implementations the set of multiple parameters comprises a second parameter that represents a value of the operating frequency of the qubit at the sixth time, wherein the value of the second parameter is greater than or equal to the holding frequency and less than the idling frequency.

In some implementations the set of multiple parameters comprises a third parameter that represents a duration between the second time and the fourth time.

In some implementations the set of multiple parameters comprises a fourth parameter that represents a smoothness of the adjustment of the qubit operating frequency between one or more of i) the second time and the sixth time or ii) the sixth time and the fourth time.

In some implementations during the reset operation the control electronics is further configured to: adiabatically adjust the qubit operating frequency from i) a current operating frequency to ii) the holding frequency to transfer qubit excitations to the resonator; and hold the qubit operating frequency at the holding frequency such that resonator excitations decay.

In some implementations prior to the reset operation the qubit occupies a non-computational level and after the reset operation the qubit occupies a ground state included in the two computational levels.

In some implementations the reset operation is repeatedly performed after each of multiple rounds of quantum error correction.

The subject matter described in this specification can be implemented in particular ways so as to realize one or more of the following advantages.

A system implementing the presently described bounce reset protocol can reset a qubit in less time compared to conventional reset protocols. For example, a qubit can be reset using the presently described bounce reset protocol in tens of nanoseconds whereas conventional reset protocols typically require hundreds of nanoseconds.

In addition, implementations of the presently described bounce reset protocol can achieve similar or improved reset performance with the above described shorter reset times. For example, the presently described bounce reset protocol can achieve near perfect elimination of diabatic error. In addition, implementations of the presently described bounce reset protocol can achieve improved reset of higher leakage states with a reset time that is similar to conventional reset protocols.

In addition, the presently described techniques are particularly suitable for fault tolerant quantum computing devices that implement quantum error correction (QEC). In QEC applications, the presently described bounce reset protocol can improve QEC performance. For example, the error suppression factor for error correction codes can be improved since a reduction in reset hold time leads to reduced errors on data qubits.

Details of one or more implementations of the subject matter of this specification are set forth in the accompanying drawings and the description below. Other features, aspects, and advantages of the subject matter will become apparent from the description, the drawings, and the claims.

DETAILED DESCRIPTION

Figure 1:
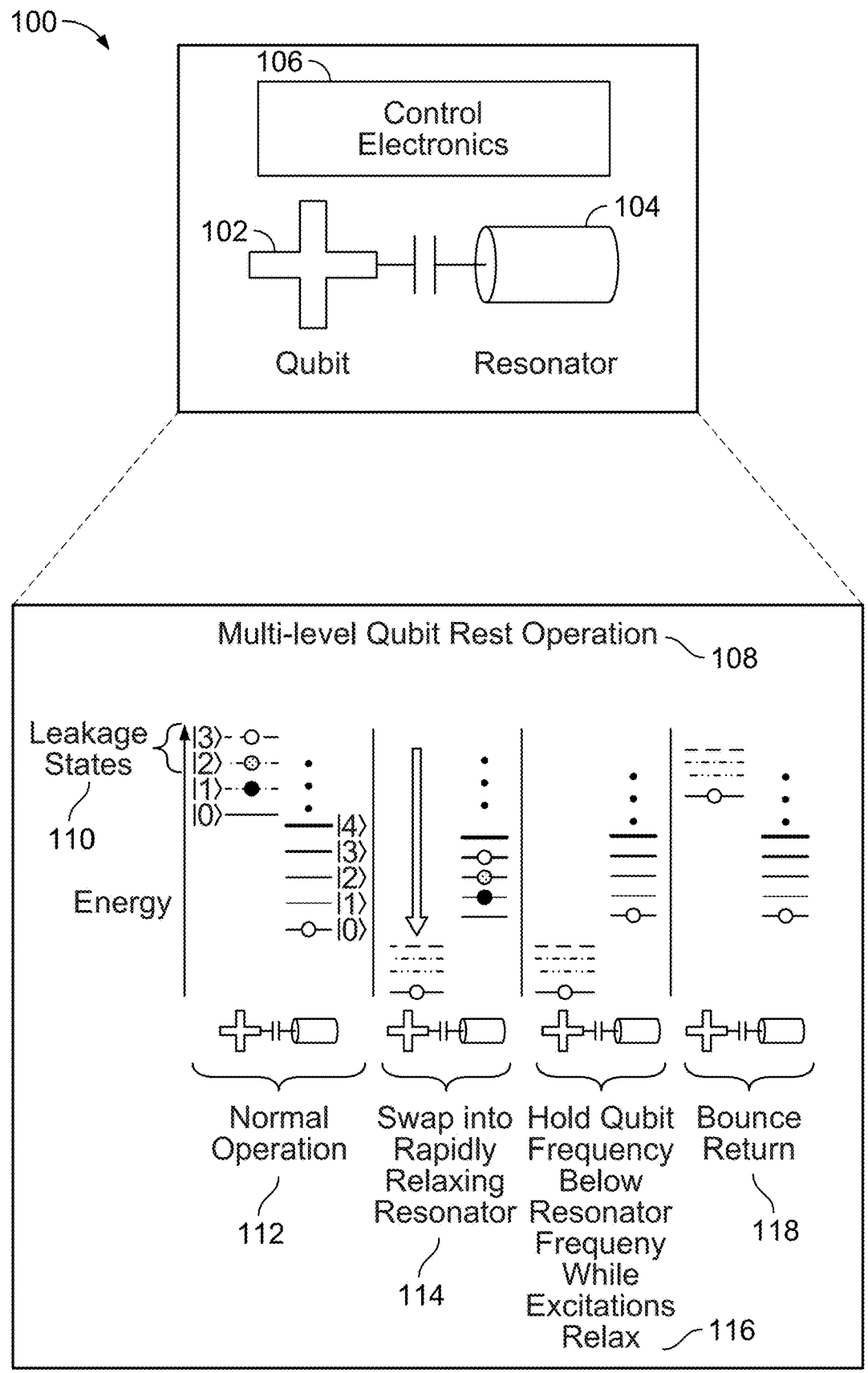
FIG. 1 depicts an example system for performing a multi-level qubit reset.

Quantum computing requires accurately reset qubits in order to carry out useful operations. Qubit reset can be realized by unconditionally swapping qubit excitations into a microwave resonator, where the excitation decay rate is many orders of magnitude faster than the natural decay rate of the qubit. This can be accomplished by moving the qubit past the resonator in frequency space on a well-defined schedule. The qubit is then brought back to its operating frequency so that operations can continue.

A problem arises if the qubit is brought back to its operating frequency too soon after swapping excitations into the resonator. The control electronics cannot shift the frequency of the qubit instantaneously, and so the qubit returns back to its operating frequency over a trajectory that takes some non-zero duration. When this happens, there is also a non-zero probability of re-exciting the qubit if there are excitations in the resonator, according to the Landau-Zener formula. If the qubit is re-excited, this manifests as a reset error, since an initialized qubit ground state is not obtained.

One approach to bypass this limitation is to wait a sufficiently long time between swapping the excitations into the resonator and returning the qubit to its operating frequency, so that the excitations in the resonator decay to a negligible population. However, even with the relatively faster resonator decay rates, this still requires a few hundred nanoseconds of wait time to attain resonator populations on the order of the thermal population. On the timescales of current error correction protocols, where each iteration takes around 500 ns, adding a few hundred nanoseconds becomes a considerable cost.

This specification describes a new approach for qubit reset that exploits the coherent nature of Landau-Zener transitions. By bringing the qubit frequency back to the resonator frequency for a short duration in a carefully controlled manner after the return trajectory, a destructive interference condition where the resonator population cannot be transferred back to the qubit is obtained. The implication of this approach is that the time required to reset the qubit is reduced. Instead of waiting hundreds of nanoseconds for the resonator population to fully decay, only tens of nanoseconds are required to ensure the destructive interference condition can be achieved.

The presently described qubit frequency trajectory is referred to herein as a "bounce reset" trajectory, since during reset the qubit frequency "bounces" off the resonator frequency to create this destructive interference. As used in this specification, a "trajectory" is plot of frequency over time. Thus, when describing the derivative of a frequency trajectory, the specification is referring to the change in the frequency at a particular time. With the reduction in reset time, the presently described bounce reset operation results in measurable decreases in qubit idle error, which leads to measurable increases in error correction performance.

Example Operating Environment

FIG. 1 depicts an example system 100 for performing multi-level qubit reset. The example system 100 is an example of a system implemented as part of a quantum computing device in which the systems, components and techniques described in this specification can be implemented.

The system 100 includes a qubit 102, a resonator 104 that is coupled to the qubit 102, and control electronics 106. The qubit 102 can be in a quantum state that occupies one or more levels. The levels include two computational levels, e.g., levels 0- and 1-, and one or more non-computational levels that are each higher in energy (or equivalently, higher in frequency) than the computational qubit levels, e.g., levels 2- and 3-. Population of the higher, non-computational qubit levels can introduce errors in algorithmic operations or quantum computations performed using the qubit 102. For example, the occupation of qubit levels outside the computational subspace can hamper or prevent the implementation of quantum error correction operations. Therefore, the qubit 102 can require qubit reset operations where downward transitions between qubit levels are performed until the lowest qubit level is reached, as described in more detail below.

The qubit 102 can be, but is not limited to, a superconducting qubit or semiconducting qubit. For example, the qubit 102 can be part of a linear chain of capacitively coupled Xmon qubits included in a quantum computing device. However, in other cases the qubit 102 can be a flux qubit, phase qubit, or qubit with frequency interactions. In general, the qubit may be any physical system with multiple energy levels that comprise a two-level computational subspace and a non-computational subspace of at least one energy level.

The resonator 104 can be a resonator designed for readout of the qubit state, with a strong coupling to the environment which produces rapid relaxation.

The qubit 102 is coupled to the resonator 104 via a coupler. The coupler can, in principle, be any type of coupler, e.g., a capacitive or inductive coupler. In some implementations, the coupler that couples the qubit 102 to the resonator 104 can be controllable. For example, the strength of the coupler can be frequency controllable. In other implementations the qubit 102 can be coupled to the resonator via a fixed (non-controllable) coupling, e.g., using a capacitor. In these implementations the interaction between the qubit and resonator is controlled only by the frequency of the qubit, rather than by a control applied to the coupler.

The control electronics 106 include control devices, e.g., arbitrary waveform generators, that can operate the qubit 102, resonator 104, and in some implementations the coupler between the qubit 102 and resonator 104. For example, the control electronics 106 can include control devices that tune the operating frequency of the qubit 102, the operating frequency of the resonator 104, or the coupler between the qubit 102 and resonator 104 by applying control signals, e.g., voltage pulses, to the qubit, resonator, or coupler through respective control lines.

The system can program the control electronics 106 to perform a multi-level qubit reset operation 108. For example, during a normal operation 112 of the qubit 102, e.g., when using the qubit to perform quantum computations, the qubit 102 can unintentionally occupy non-computational levels and be in a leakage state 110. In the example shown in FIG. 1 the qubit 102 occupies levels 2- and 3-. To perform the multi-level qubit reset operation 108 the control electronics 106 controls the frequency of the qubit 102 such that the operating frequency of the qubit is adjusted relative to the resonator operating frequency and a population of a non-computational level is swapped 114 to the resonator 104. For example, the control electronics can adjust the operating frequency from an idling frequency to a holding frequency, where the idling frequency is higher than the operating frequency of the resonator and the holding frequency is lower than the operating frequency of the resonator.

The control electronics 106 can then hold the operating frequency of the qubit below the resonator operating frequency whilst the population of the non-computational level that was swapped to the resonator 104 relaxes.

The control electronics 106 can then return the qubit operating frequency to the idling frequency in a bounce return 118 according to a bounce return frequency trajectory. Performing a bounce return 118 and example bounce return frequency trajectories are described in more detail below with reference to FIGS. 3-10.

Figure 2:
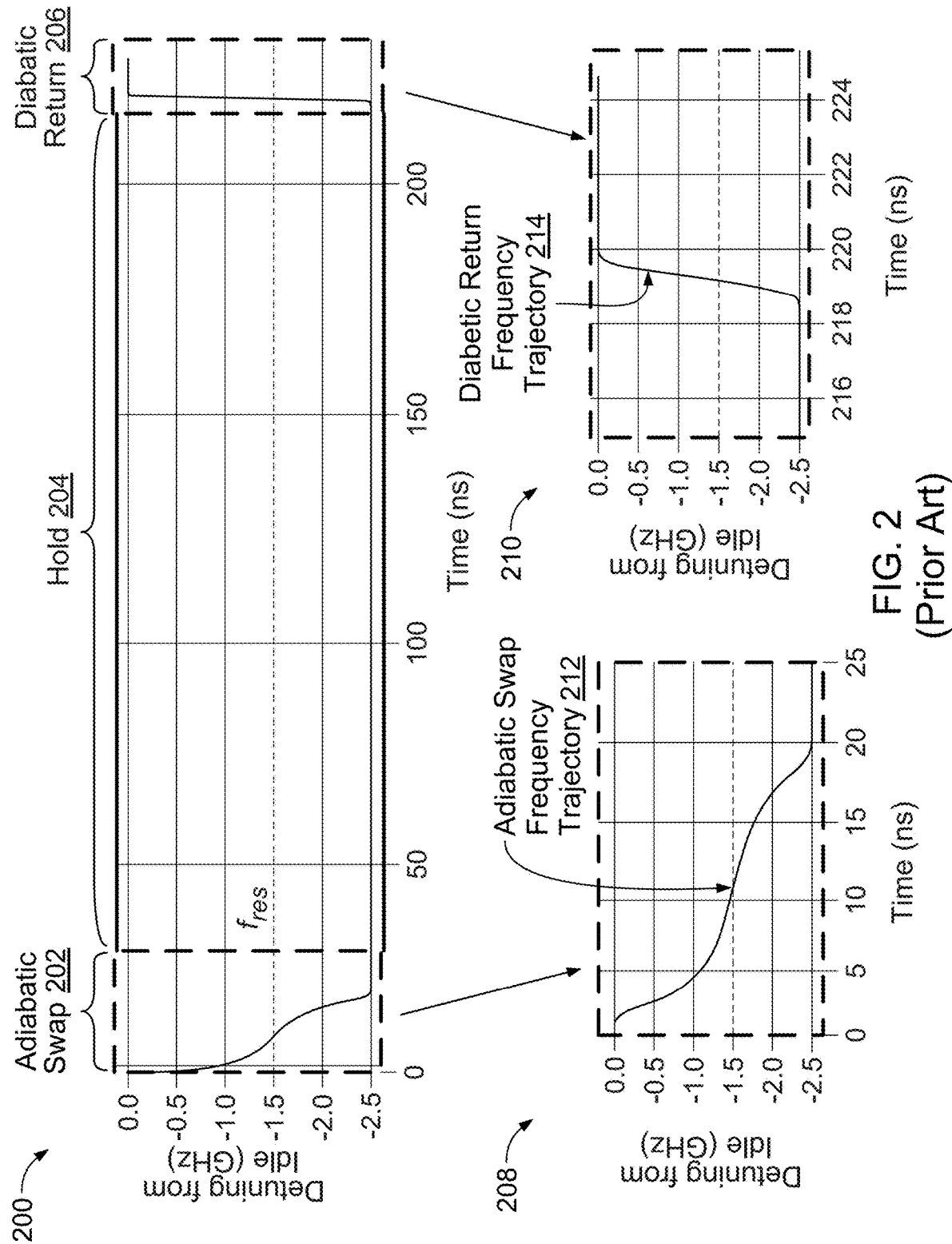
FIG. 2 shows a plot of an example frequency trajectory for performing a multi-level qubit reset using a conventional approach.

FIG. 2 shows a plot 200 of an example frequency trajectory for performing a multi-level qubit reset using a conventional approach. As described above with reference to FIG. 1, after normal operation the qubit operating frequency is adjusted (or equivalently detuned) from an idling frequency (corresponding to 0.0 GHz detuning from idle) to a holding frequency (corresponding to −2.5 GHz detuning from idle) during an adiabatic swap phase 202 according to an adiabatic swap frequency trajectory 212. During the adjustment the qubit operating frequency crosses the resonator frequency $f_{res}$ (corresponding to −1.5 Ghz detuning from idle) so that qubit excitations are transferred to the resonator. The adiabatic swap frequency trajectory 212 is shown in plot 208. In the example shown in FIG. 2, the adiabatic swap phase 202 requires approximately 20 ns.

The qubit operating frequency is then maintained at the holding frequency during a hold phase 204. During the hold phase 204 the excitations that were transferred to the resonator during the adiabatic swap phase 202 decay. In the example shown in FIG. 2, the hold phase 204 requires approximately 200 ns.

The qubit operating frequency is then adjusted from the holding frequency to the idling frequency during a return phase 206 according to a diabatic return frequency trajectory 214. During the adjustment the qubit operating frequency crosses the resonator frequency f r s once. The diabatic return frequency trajectory 214 is shown in plot 210. In the example shown in FIG. 2, the return phase 206 requires approximately 4 ns.

In practice, the return phase 206 may not be sufficiently diabatic and can cause an adiabatic transition where remaining excitations in the resonator are transferred back to the qubit during the return phase 206. Therefore, the long hold time during the hold phase 204 is necessary for the resonator excitation to decay. Typically, the resonator cannot be tuned to decay faster. However, the return phase 206 can be engineered to improve its resilience to errors in the presence of residual resonator excitations, resulting in the bounce return phase described below in FIG. 3. Accordingly, the hold phase 204 can be removed or its duration significantly reduced, e.g., halved.

Figure 3:
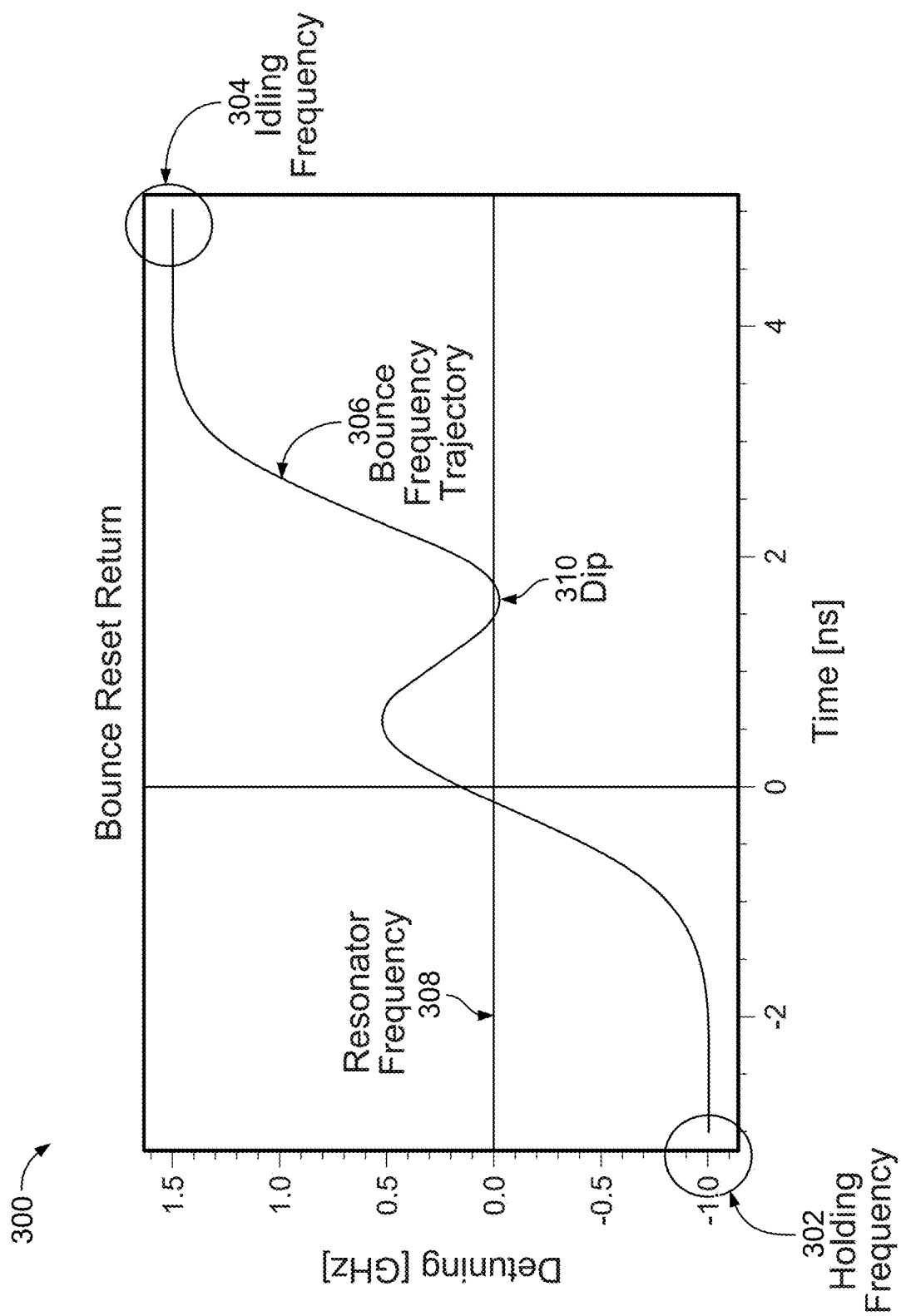
FIG. 3 shows a plot of an example return frequency trajectory for performing the presently described bounce reset.

FIG. 3 shows a plot of an example bounce return phase 300. The example bounce return phase 300 can be performed as part of a bounce reset operation, e.g., following a swap phase 202 and hold phase 204 similar to those described above with reference to FIG. 2. After a hold phase, the qubit operating frequency is adjusted from the corresponding holding frequency 302 to the idling frequency 304 according to a bounce frequency trajectory 306. The bounce frequency trajectory 306 crosses the resonator frequency 308 (in this example at a time corresponding to −0.25 ns) and subsequently dips then "bounces off" the resonator frequency 308 (in this example) at a time corresponding to 1.75 ns) before reaching the idling frequency 304.

The time at which the bounce frequency trajectory 306 crosses the resonator frequency 308 and bounces off the resonator frequency 308 can vary, as described in more detail below with reference to FIG. 4. Generally, a bounce frequency trajectory has the following properties: a first derivative of the bounce frequency trajectory at a first time during the bounce return phase is positive, a first derivative of the bounce frequency trajectory at a second time that occurs after the first time is zero, a first derivative of the bounce frequency trajectory at a third time that occurs after the second time is positive, and the operating frequency of the qubit achieves the idling frequency at a fourth time that occurs after the third time. As discussed above, in this specification a "frequency trajectory" is plot of the frequency over time. Thus, when describing the derivative of a frequency trajectory, the specification is referring to the change in the frequency at a particular time.

The frequency trajectory 306 may increase during a first time interval containing the first time, reach a stationary point (e.g. maximum or point of inflection) at the second time after the first time period (e.g., the first time period may end at the second time), and increase again during a third time interval containing the third time that occurs after the second time until the qubit idling frequency is reached at the fourth time. The frequency trajectory 306 may be held at the stationary point for a second time interval containing the second time, or alternatively may pass through the stationary point without being held.

For example, in the example bounce frequency trajectory 306 shown in FIG. 3, a first derivative of the bounce frequency trajectory 306 at first time in the interval [−1.5 ns, 0.5 ns] is positive, a first derivative of the bounce frequency trajectory 306 at a second time 0.6 ns that occurs after the first time is zero, a first derivative of the bounce frequency trajectory 306 at a third time in the interval [1.75 ns, 3.9 ns] that occurs after the second time is positive, and the operating frequency of the qubit achieves the idling frequency at a fourth time 4.0 ns that occurs after the third time.

In some implementations a first derivative of the bounce frequency trajectory at a fifth time that occurs after the second time and before the third time is negative and a first derivative of the bounce frequency trajectory at a sixth time that occurs after the fifth time and before the third time is zero. That is, after crossing the resonator frequency and levelling out at the second time, the bounce frequency trajectory can decrease during a fifth time interval containing the fifth time then increase to reach the idling frequency and therefore form a dip 310 in the trajectory 306. The shape and position of the dip 310 can tuned to define a bounce frequency trajectory that optimizes qubit reset error.

Figure 4:
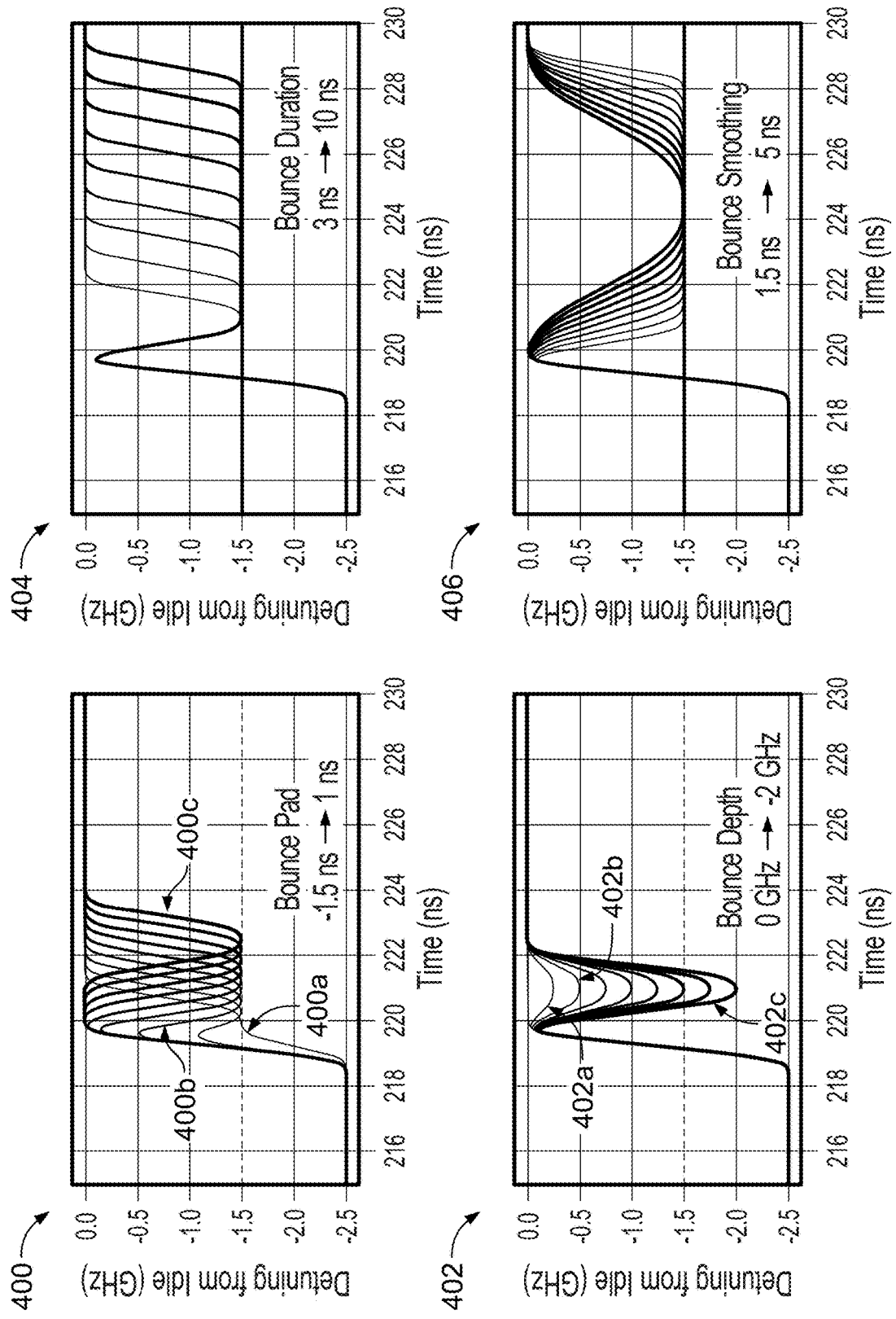
FIG. 4 shows example parameters for tuning a bounce return frequency trajectory.

FIG. 4 shows example parameters for tuning a bounce frequency trajectory. A first parameter that can be tuned to define an optimal bounce frequency trajectory is the time at which a first derivative of the bounce frequency trajectory is first equal to zero, e.g., a value of the second time described above with reference to FIG. 3, and is referred to as the bounce pad. Plot 400 shows example bounce frequency trajectories with varying bounce pad values.

In some implementations the value of the qubit operating frequency at the second time is equal to the resonator frequency. That is, the bounce frequency trajectory increases from the holding frequency to the resonator frequency, is held at the resonator frequency for some time (e.g., according to the third parameter described below), then increases from the resonator frequency to the idling frequency. This results in a bounce frequency trajectory similar to trajectory 400a.

In other implementations the value of the qubit operating frequency at the second time is greater than the resonator frequency and less than or equal to the idling frequency. That is, the bounce frequency trajectory increases from the holding frequency, crosses the resonator frequency, increases further until the value of the frequency at the second time is reached, decreases until the sixth time is reached, and increases to the idling frequency. This results in a bounce frequency trajectory similar to the other trajectories shown in plot 400, e.g., trajectory 400b or 400c. In these implementations the first parameter can take values between −1.5 ns and 1 ns (where 0 ns corresponds to a halfway time of the bounce return, as shown in FIG. 3).

A second parameter that can be tuned to define an optimal bounce frequency trajectory is the frequency at which a first derivative of the bounce frequency trajectory is subsequently equal to zero, e.g., a value of the qubit operating frequency at the sixth time described above with reference to FIG. 3, and is referred to as the bounce depth. Plot 402 shows example bounce frequency trajectories with varying bounce depth values.

In some implementations the value of the qubit operating frequency at the sixth time is greater than or equal to the holding frequency and is less than the idling frequency. That is, after the bounce frequency trajectory crosses the resonator frequency once and levels out at a frequency that is higher than the resonator frequency, the bounce frequency trajectory can dip before increasing and reaching the idling frequency, where the depth of the dip is defined by the second parameter. This results in bounce frequency trajectories similar to the trajectories shown in plot 402, e.g., 402a-c. In these implementations the second parameter can take values between 0.0 GHz and −2 GHz.

A third parameter that can be tuned to define an optimal bounce frequency trajectory is the duration between a time at which a first derivative of the bounce frequency trajectory is first equal to zero and a time at which the bounce frequency trajectory reaches the idling frequency, e.g., a duration between the second time and the fourth time described above with reference to FIG. 3, and is referred to as the bounce duration. Plot 404 shows example bounce frequency trajectories with varying bounce durations. In some implementations the third parameter can take values between 3 ns and 10 ns, where smaller values can be preferred since this can reduce the overall time required to perform the return phase and therefore the multi-level reset.

A fourth parameter that can be tuned to define an optimal bounce frequency trajectory is the smoothness of the trajectory, e.g., the smoothness between the second time and the sixth time and/or the sixth time and the fourth time as described above with reference to FIG. 3, and is referred to as the bounce smoothness. Plot 408 shows example bounce frequency trajectories with varying bounce smoothness. In some implementations the fourth parameter can take values between 1.5 ns and 5 ns, where a smaller value indicates a less smooth and more rectangular trajectory.

Any combination of the above described parameters can be tuned to define an optimal frequency trajectory that can be used to implement qubit reset with reduced reset error.

Figure 5:
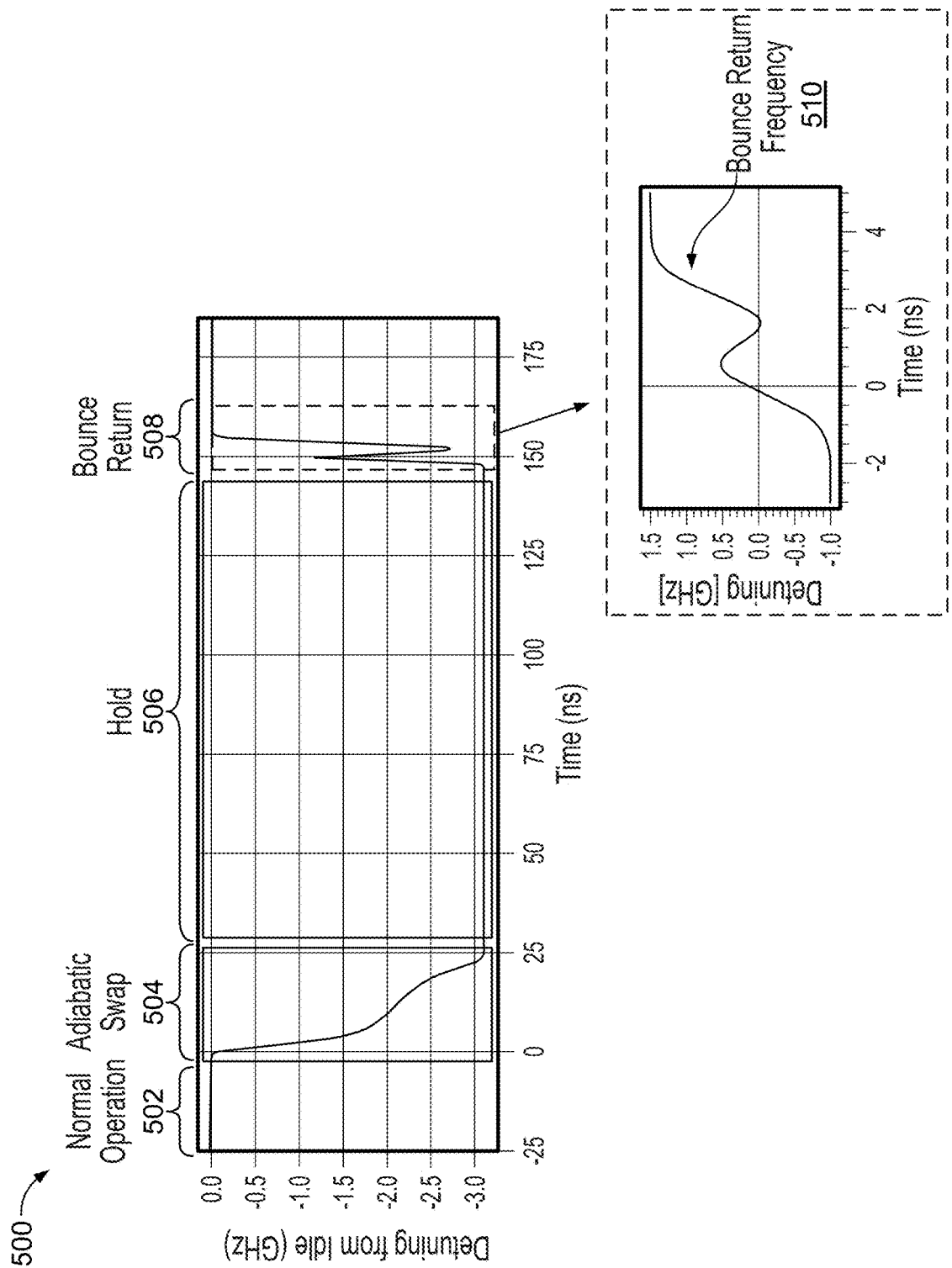
FIG. 5 shows a plot of an example frequency trajectory for performing a multi-level qubit reset using the presently described bounce reset approach.

FIG. 5 shows a plot 500 of an example frequency trajectory for performing a multi-level qubit reset using the presently described bounce reset approach. As described above with reference to FIG. 2, after normal operation 502 the qubit operating frequency is adjusted (or equivalently detuned) from an idling frequency (corresponding to 0.0 GHz detuning from idle) to a holding frequency (corresponding to −3.1 GHz detuning from idle in this example) during an adiabatic swap phase 504 according to an adiabatic swap frequency trajectory. During the adjustment the qubit operating frequency crosses the resonator frequency so that qubit excitations are transferred to the resonator. The qubit operating frequency is then maintained at the holding frequency during a hold phase 506. During the hold phase 506 the excitations that were transferred to the resonator during the adiabatic swap phase 504 decay. In the example shown in FIG. 5, the hold phase 506 requires approximately 125 ns—shorter than the hold phase described above with reference to FIG. 2. The qubit operating frequency is then adjusted from the holding frequency to the idling frequency during a bounce return phase 508 according to a bounce frequency trajectory 510.

Programming the Hardware: Example Processes for Performing Qubit Reset

Figure 6:
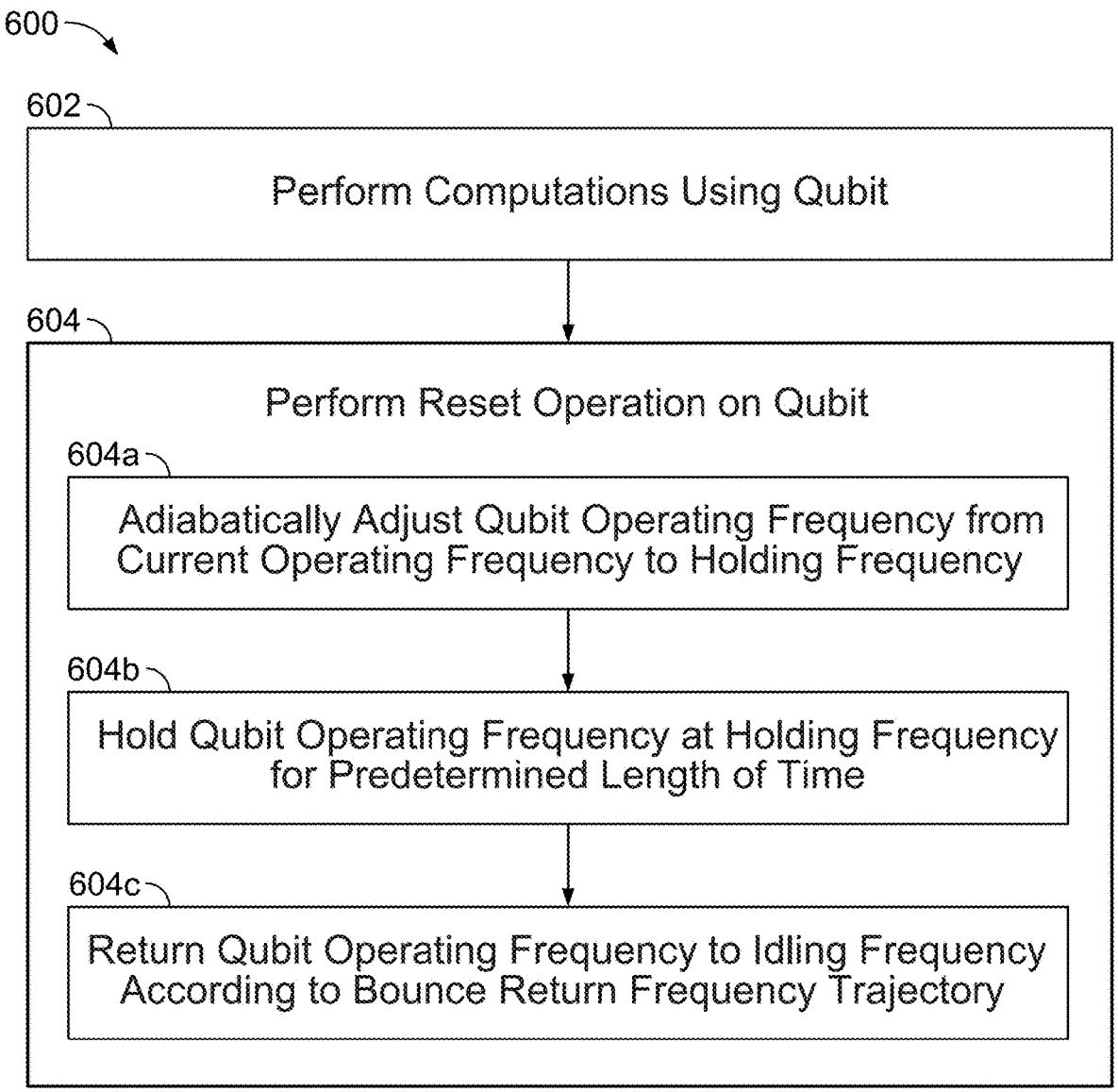
FIG. 6 is a flow diagram of an example process for resetting a qubit.

FIG. 6 is a flow diagram of an example process 600 for resetting a qubit. For convenience, the process 600 will be described as being performed by quantum hardware in communication with control electronics located in one or more locations. For example, the system 100 of FIG. 1, appropriately programmed in accordance with this specification, can perform the process 600.

The system controls an operating frequency of the qubit. As described above with reference to FIG. 1, the qubit can be coupled to a resonator that operates at a resonator frequency. The state of the qubit occupies at least one of multiple levels, where the multiple levels include two computational levels and one or more non-computational levels that are each higher than the computational levels, e.g., levels −2, −3, etc.

The system performs computations using the qubit (step 602). For example, the qubit can be part of an array of qubits that the system uses to perform quantum computations. Ideally, during the quantum computations the state of the qubit will remain in the computational subspace, i.e., the qubit state will be a superposition of the two computational levels. However, in practice the qubit may not be a perfect qubit that can be perfectly controlled and the qubit state can leak into non-computational levels. Therefore, the system can regularly perform a qubit reset to set the qubit state in a computational level. For example, the system can determine to perform a reset operation at regular time intervals or after a predetermined sequence of computations has been performed, e.g., after each of multiple rounds of quantum error correction.

In response to determining that the qubit requires a reset, the system performs a reset operation on the qubit (step 604). To perform the reset operation the system can adiabatically adjust the qubit operating frequency from a current operating frequency, e.g., an idling frequency, to a holding frequency to transfer qubit excitations to the resonator (step 604a). For example, the system can adjust the qubit operating frequency according to the frequency trajectory shown in plot 208 of FIG. 2. The system can then hold the qubit operating frequency at the holding frequency for a predetermined amount of time such that resonator excitations decay (step 604b). The predetermined amount of time can be determined by performing experiments, e.g., experiments that produce the data shown in FIG. 9, where the hold time is varied, and the corresponding reset performance is observed. Taking into account other errors in the device, we a hold time that balances the error of this operation with other errors can be determined. In some implementations the hold time can be chosen to be long enough that the error is as low as can be measured, e.g., as shown by the flat portion in FIG. 9, but no longer.

The system can then adjust the operating frequency of the qubit to return the qubit operating frequency from the holding frequency to the idling frequency according to a bounce return frequency trajectory (as described above with reference to FIGS. 3-5). The holding frequency is lower than the resonator frequency and the idling frequency is higher than the resonator frequency (step 604c). A first derivative of the qubit operating frequency at a first time during the adjustment of step 604c is positive, and at a second time during the adjustment that occurs after the first time is zero, and at a third time during the adjustment that occurs after the second time is positive. The operating frequency of the qubit achieves the idling frequency at a fourth time that occurs after the third time. In some implementations a first derivative of the qubit operating frequency at a fifth time during the adjustment is negative, where the fifth time occurs after the second time and before the third time, and a first derivative of the qubit operating frequency at a sixth time during the adjustment is zero, where the sixth time occurs after the fifth time and before the third time.

The adjustment of the operating frequency of the qubit performed at step 604c can be defined by two tunable parameters from a set of multiple parameters. In some implementations the set of multiple parameters can include a first parameter that represents a value of the operating frequency of the qubit at the second time, where the value of the first parameter is greater than or equal to the resonator frequency and less than or equal to the idling frequency.

In some implementations the set of multiple parameters can include a second parameter that represents a value of the operating frequency of the qubit at the sixth time, where the value of the second parameter is greater than or equal to the holding frequency and less than the idling frequency. In some implementations the set of multiple parameters includes a third parameter that represents a duration between the second time and the fourth time. In some implementations the set of multiple parameters includes a fourth parameter that represents a smoothness of the adjustment of the qubit operating frequency between one or more of i) the second time and the sixth time or ii) the sixth time and the fourth time.

The adjustment of the operating frequency of the qubit performed at step 604c can be calibrated with respect to two or more of first, second, third, and fourth parameters, as described below with reference to FIG. 7.

Figure 7:
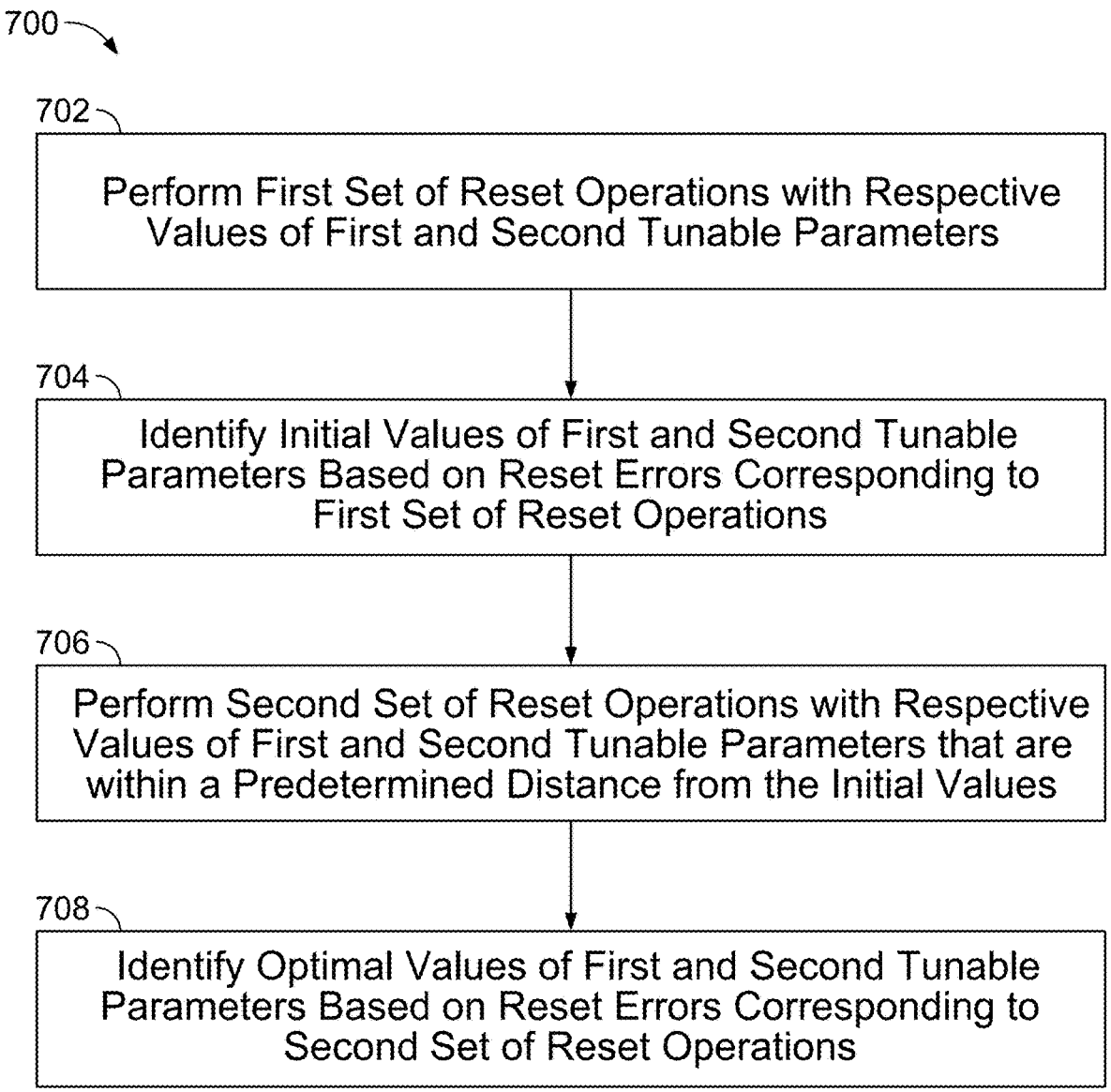
FIG. 7 is a flow diagram of an example process for calibrating an adjustment of a qubit operating frequency with respect to a first tunable parameter and a second tunable parameter.

FIG. 7 is a flow diagram of an example process 700 for calibrating an adjustment of a qubit operating frequency with respect to a first tunable parameter and a second tunable parameter. For convenience, the process 700 will be described as being performed by quantum hardware in communication with control electronics located in one or more locations. For example, the system 100 of FIG. 1, appropriately programmed in accordance with this specification, can perform the process 700.

Figure 8A:
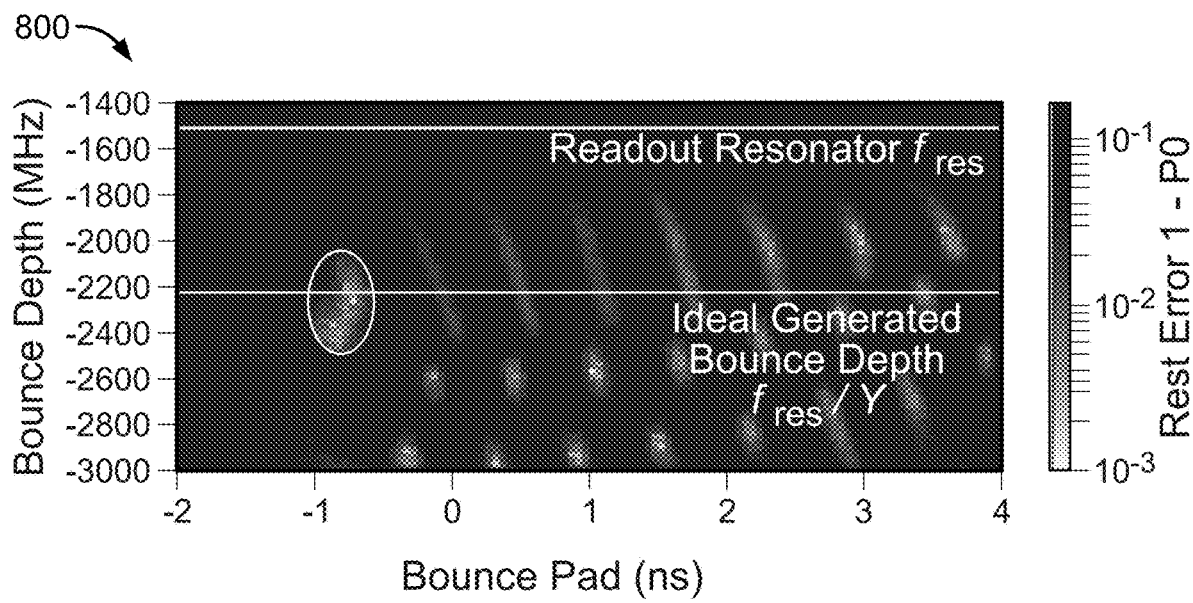
FIG. 8A is a plot that shows qubit reset errors for an example first set of qubit reset operations.

The system performs a first set of qubit reset operations (step 702). Each qubit reset operation in the first set can be performed using example process 600 described above, where each qubit reset operation corresponds to respective values of the first tunable parameter and the second tunable parameter. FIG. 8A is a plot 800 that shows qubit reset errors for an example first set of qubit reset operations. In this example, the first set of qubit reset operations were performed for bounce pad values ranging from −2 ns to 4 ns and for bounce depth values ranging from −3000 MHz to −1400 MHz. Each pixel in the plot shows a reset error for a qubit reset operation performed using corresponding bounce pad and bounce depth values. In this example, the lower reset errors are represented by lighter shaded areas, e.g., region 802.

Figure 8B:
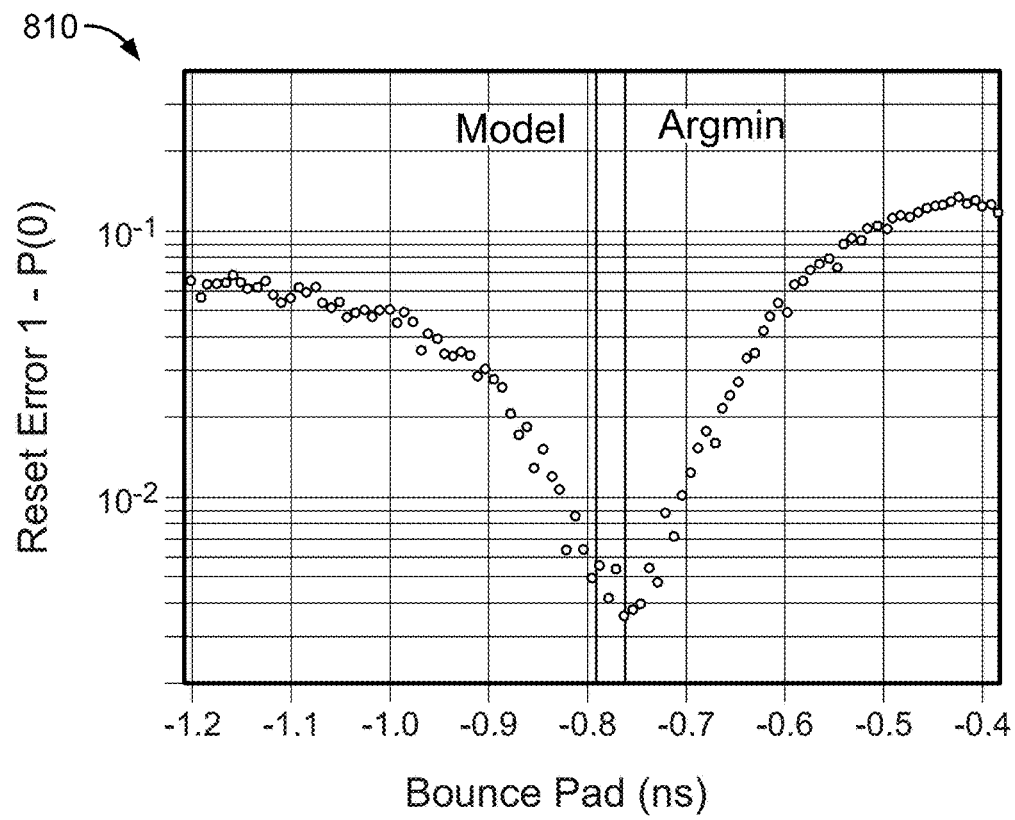
FIG. 8B is a plot that shows reset errors for bounce pad values.

Returning to FIG. 7, the system identifies an initial value of the first tunable parameter and an initial value of the second tunable parameter based on reset errors corresponding to the first set of qubit reset operations (step 704). For example, the system can identify a region in the plot 800 that has low reset errors and low bounce pad times, e.g., region 802. The system can then identify a bounce pad value in this region that achieves a lowest reset error. FIG. 8B is a plot 810 that shows reset errors for bounce pad values corresponding to region 802 of plot 800, e.g., bounce pad values between −1.2 ns and −0.4 ns. As shown, bounce pad value −0.77 ns achieves the lowest reset error. A similar process can be performed to identify a bounce depth value that achieves a lowest reset error.

Figure 8C:
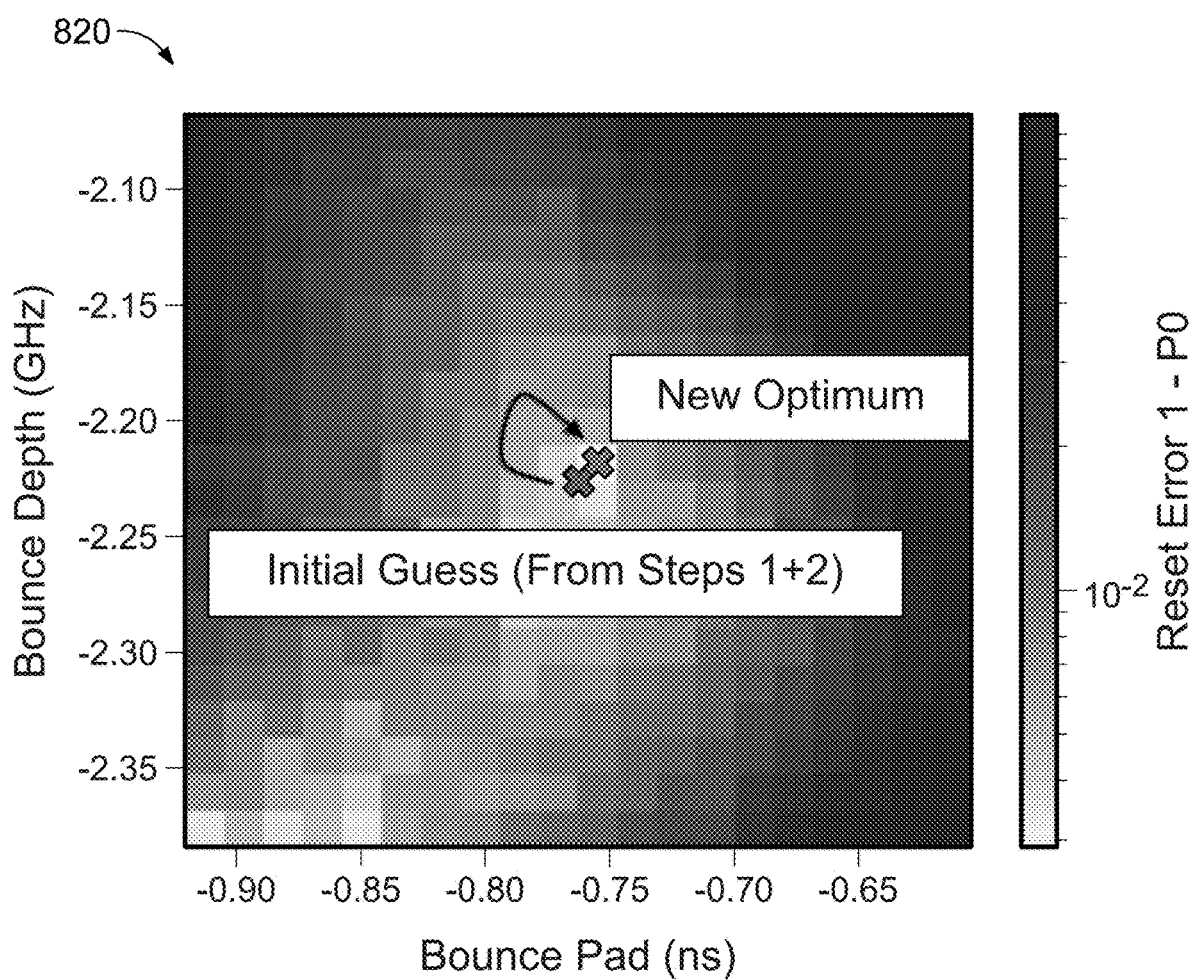
FIG. 8C is a plot that shows qubit reset errors for an example second set of qubit reset operations.

Returning to FIG. 7, the system performs a second set of qubit reset operations (step 706). Each qubit reset operation in the second set can be performed using example process 600 described above, where each qubit reset operation corresponds to respective values of the first tunable parameter and the second tunable parameter that are close to, e.g., within a predetermined distance from, the initial value of the first tunable parameter and the initial value of the second tunable parameter as identified at step 704. FIG. 8C is a plot 820 that shows qubit reset errors for an example second set of qubit reset operations. In this example, the second set of qubit reset operations were performed for bounce pad values ranging from −0.925 ns to −0.6 ns and for bounce depth values ranging from −2.38 GHz to −2.08 GHz. Each pixel in the plot shows a reset error for a qubit reset operation performed using corresponding bounce pad and bounce depth values. In this example, the lower reset errors are represented by lighter shaded areas.

Returning to FIG. 7, the system identifies an optimal value of the first tunable parameter and an optimal value of the second tunable parameter based on reset errors corresponding to the second set of qubit reset operations (step 708). For example, the system identifies a value of the first tunable parameter and a value of the second tunable parameter that produce a lowest reset error. In FIG. 8C, the lowest reset error is produced by a bounce return frequency trajectory with a bounce pad of approximately −0.75 ns and a bounce depth of approximately −2.22 GHz. The system can use these parameters to define the bounce reset frequency trajectory and implement subsequent reset operations.

Figure 9:
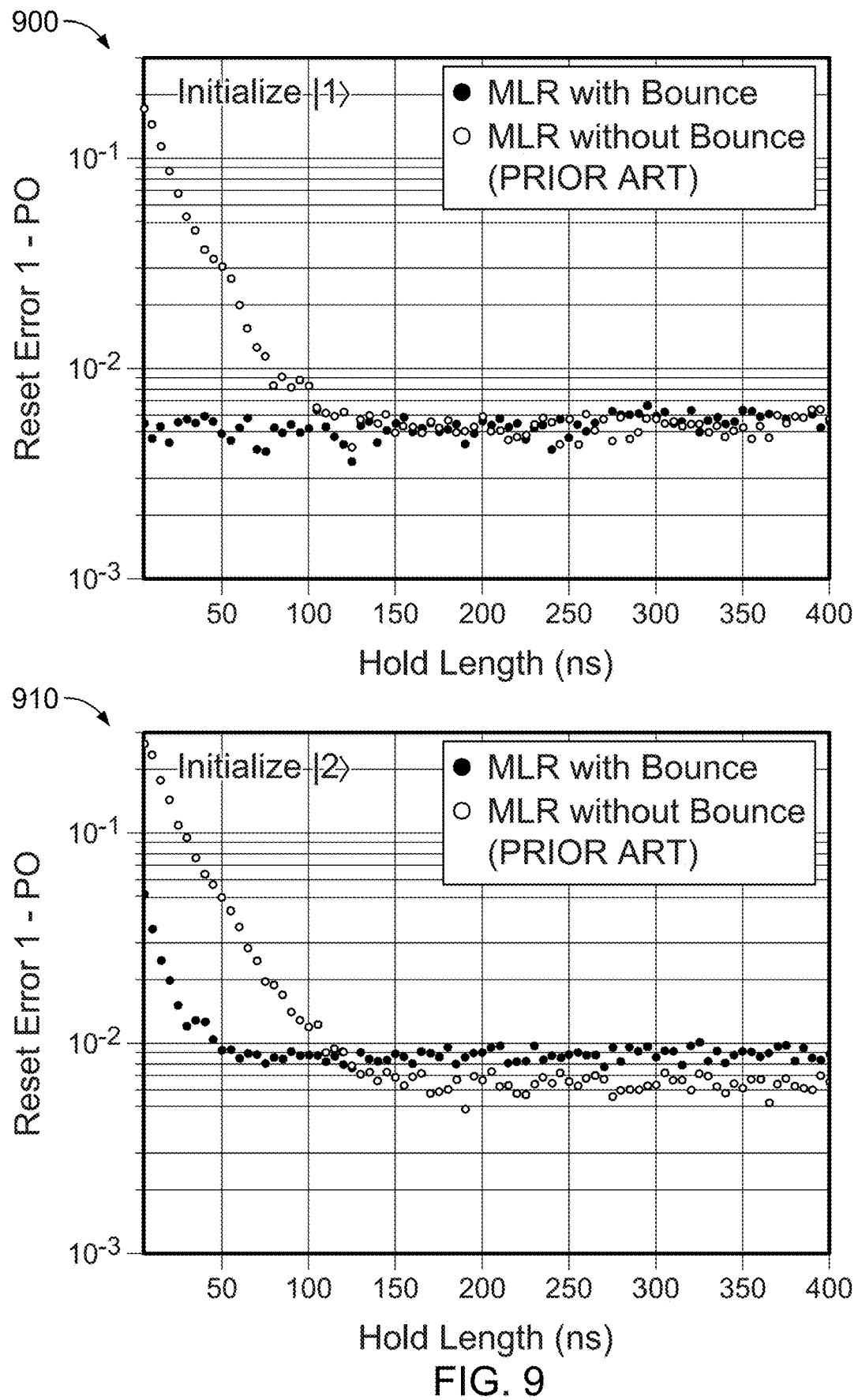
FIG. 9 shows two plots that compare reset errors versus hold lengths for a conventional (prior art) multi-level reset operation and the presently described bounce reset operation.

FIG. 9 shows two plots that compare reset errors versus hold lengths for a conventional (prior art) multi-level reset operation and the presently described bounce reset operation.

Plot 900 shows reset errors for a qubit that was initialized in a 1-state, i.e., a computational state. As shown, the qubit reset operations performed using the presently described bounce return frequency trajectory achieved lower reset errors for lower hold times. In particular, the qubit reset operations performed using the presently described bounce return frequency trajectory achieved significantly lower reset errors for hold times less than 150 ns.

Plot 910 shows reset errors for a qubit that was initialized in a 2-state, i.e., a leakage state. As shown, the qubit reset operations performed using the presently described bounce return frequency trajectory achieved lower reset errors for lower hold times. In particular, the qubit reset operations performed using the presently described bounce return frequency trajectory achieved significantly lower reset errors for hold times less than 125 ns. Plot 910 shows that the hold time cannot be removed entirely and a minimum hold time of approximately 50 ns is required to reset the leakage state. However, this hold time is significantly shorter (less than half) than the minimum hold time required by a qubit reset operation performed using a conventional multi-level reset operation that achieves a same reset error.

Figure 10:
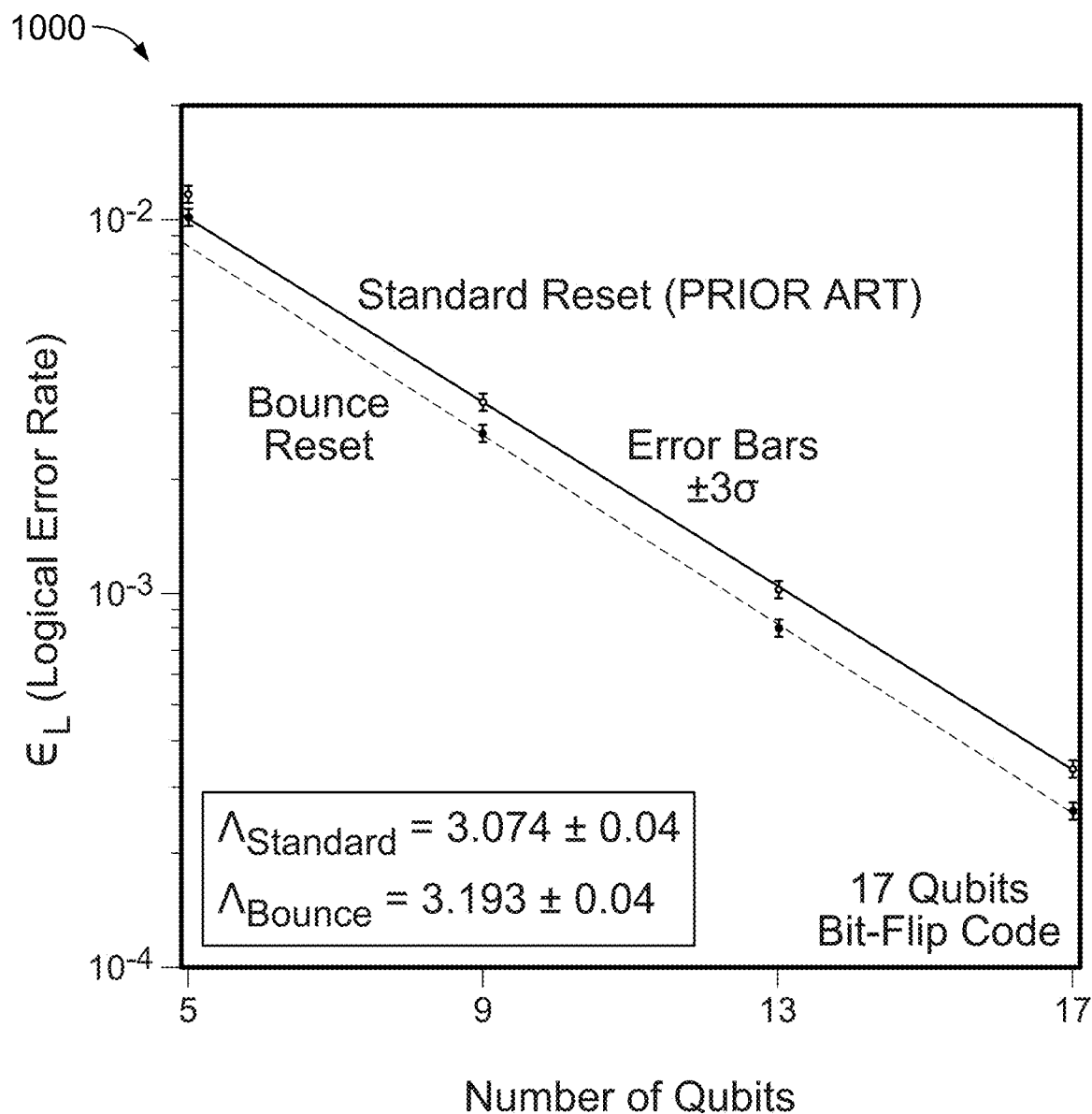
FIG. 10 is a plot that compares logical error rates versus number of qubits in a bit flip code for a conventional (prior art) multi-level reset operation and the presently described bounce reset operation.

FIG. 10 is a plot 1000 that compares logical error rates versus number of qubits in a bit flip code for a conventional (prior art) multi-level reset operation and the presently described bounce reset operation. As shown, the qubit reset operations performed using the presently described bounce return frequency trajectory achieved lower logical error rates for all numbers of qubits. In addition, the quantum error suppression factor—a measure of quantum error correction performance—was higher for qubit reset operations performed using the presently described bounce return frequency trajectory. This improvement can be explained by lower hold time required for these reset operations, since lower hold times leads to reduced errors on data qubits.

Figure 11:
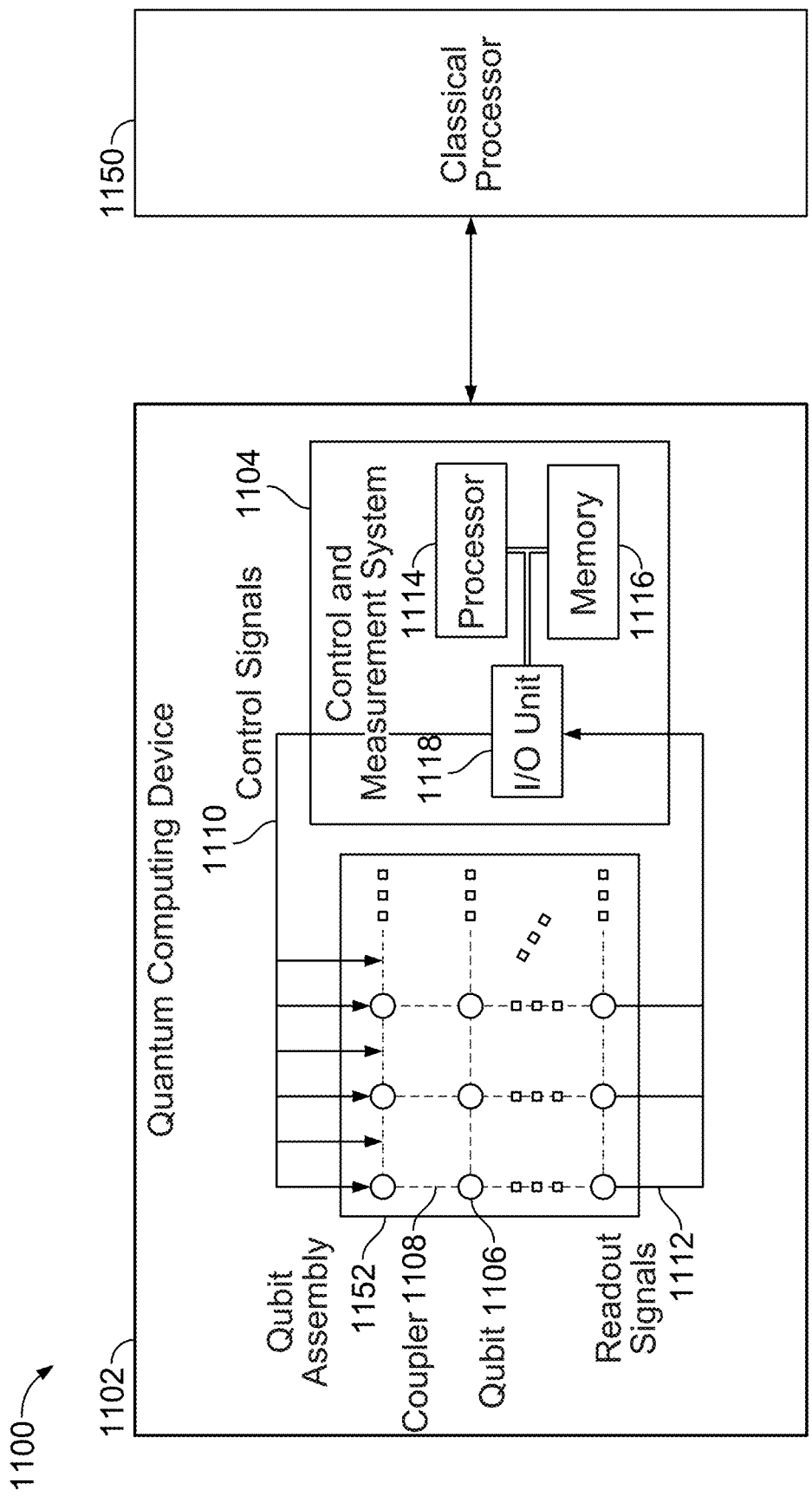
FIG. 11 depicts an example system for performing the classical and quantum computations described in this specification.

FIG. 11 depicts an example system 1100 for performing the classical and quantum computations described in this specification. The example system 1100 is an example of a system implemented as classical and quantum computer programs on one or more classical computers and quantum computing devices in one or more locations, in which the systems, components, and techniques described herein can be implemented.

The example system 1100 includes an example quantum computing device 1102. The quantum computing device 1102 can be used to perform the quantum computation operations described in this specification according to some implementations. The quantum computing device 1102 is intended to represent various forms of quantum computing devices. The components shown here, their connections and relationships, and their functions, are exemplary only, and do not limit implementations of the inventions described and/or claimed in this document.

The example quantum computing device 1102 includes a qubit assembly 1152 and a control and measurement system 1104. The qubit assembly includes multiple qubits, e.g., qubit 1106, that are used to perform algorithmic operations or quantum computations. While the qubits shown in FIG. 11 are arranged in a rectangular array, this is a schematic depiction and is not intended to be limiting. The qubit assembly 1152 also includes adjustable coupling elements, e.g., coupler 1108, that allow for interactions between coupled qubits. In the schematic depiction of FIG. 11, each qubit is adjustably coupled to each of its four adjacent qubits by means of respective coupling elements. However, this is an example arrangement of qubits and couplers and other arrangements are possible, including arrangements that are non-rectangular, arrangements that allow for coupling between non-adjacent qubits, and arrangements that include adjustable coupling between more than two qubits.

Each qubit can be a physical two-level quantum system or device having levels representing logical values of 0 and 1. The specific physical realization of the multiple qubits and how they interact with one another is dependent on a variety of factors including the type of the quantum computing device included in example system 1100 or the type of quantum computations that the quantum computing device is performing. For example, in an atomic quantum computer the qubits may be realized via atomic, molecular or solid-state quantum systems, e.g., hyperfine atomic states. As another example, in a superconducting quantum computer the qubits may be realized via superconducting qubits or semi-conducting qubits, e.g., superconducting transmon states. As another example, in a NMR quantum computer the qubits may be realized via nuclear spin states.

In some implementations a quantum computation can proceed by initializing the qubits in a selected initial state and applying a sequence of unitary operators on the qubits. Applying a unitary operator to a quantum state can include applying a corresponding sequence of quantum logic gates to the qubits. Example quantum logic gates include single-qubit gates, e.g., Pauli-X, Pauli-Y, Pauli-Z (also referred to as X, Y, Z), Hadamard gates, S gates, rotations, two-qubit gates, e.g., controlled-X, controlled-Y, controlled-Z (also referred to as CX, CY, CZ), controlled NOT gates (also referred to as CNOT) controlled swap gates (also referred to as CSWAP), and gates involving three or more qubits, e.g., Toffoli gates. The quantum logic gates can be implemented by applying control signals 1110 generated by the control and measurement system 1104 to the qubits and to the couplers.

For example, in some implementations the qubits in the qubit assembly 1152 can be frequency tuneable. In these examples, each qubit can have associated operating frequencies that can be adjusted through application of voltage pulses via one or more drive-lines coupled to the qubit. Example operating frequencies include qubit idling frequencies, qubit holding frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tuneable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates.

The type of control signals 1110 used depends on the physical realizations of the qubits. For example, the control signals may include RF or microwave pulses in an NMR or superconducting quantum computer system, or optical pulses in an atomic quantum computer system.

A quantum computation can be completed by measuring the states of the qubits, e.g., using a quantum observable such as X or Z, using respective control signals 1110. The measurements cause readout signals 1112 representing measurement results to be communicated back to the measurement and control system 1104. The readout signals 1112 may include RF, microwave, or optical signals depending on the physical scheme for the quantum computing device and/or the qubits. For convenience, the control signals 1110 and readout signals 1112 shown in FIG. 11 are depicted as addressing only selected elements of the qubit assembly (i.e., the top and bottom rows), but during operation the control signals 1110 and readout signals 1112 can address each element in the qubit assembly 1152.

The control and measurement system 1104 is an example of a classical computer system that can be used to perform various operations on the qubit assembly 1152, as described above, as well as other classical subroutines or computations. The control and measurement system 1104 includes one or more classical processors, e.g., classical processor 1114, one or more memories, e.g., memory 1116, and one or more I/O units, e.g., I/O unit 1118, connected by one or more data buses. The control and measurement system 1104 can be programmed to send sequences of control signals 1110 to the qubit assembly, e.g., to carry out a selected series of quantum gate operations, and to receive sequences of readout signals 1112 from the qubit assembly, e.g., as part of performing measurement operations.

The processor 1114 is configured to process instructions for execution within the control and measurement system 1104. In some implementations, the processor 1114 is a single-threaded processor. In other implementations, the processor 1114 is a multi-threaded processor. The processor 1114 is capable of processing instructions stored in the memory 1116.

The memory 1116 stores information within the control and measurement system 1104. In some implementations, the memory 1116 includes a computer-readable medium, a volatile memory unit, and/or a non-volatile memory unit. In some cases, the memory 1116 can include storage devices capable of providing mass storage for the system 1104, e.g., a hard disk device, an optical disk device, a storage device that is shared over a network by multiple computing devices (e.g., a cloud storage device), and/or some other large capacity storage device.

The input/output device 1118 provides input/output operations for the control and measurement system 1104. The input/output device 1118 can include D/A converters, A/D converters, and RF/microwave/optical signal generators, transmitters, and receivers, whereby to send control signals 1110 to and receive readout signals 1112 from the qubit assembly, as appropriate for the physical scheme for the quantum computer. In some implementations, the input/output device 1118 can also include one or more network interface devices, e.g., an Ethernet card, a serial communication device, e.g., an RS-232 port, and/or a wireless interface device, e.g., an 802.11 card. In some implementations, the input/output device 1118 can include driver devices configured to receive input data and send output data to other external devices, e.g., keyboard, printer, and display devices.

Although an example control and measurement system 1104 has been depicted in FIG. 11, implementations of the subject matter and the functional operations described in this specification can be implemented in other types of digital electronic circuitry, or in computer software, firmware, or hardware, including the structures disclosed in this specification and their structural equivalents, or in combinations of one or more of them.

The example system 1100 includes an example classical processor 1150. The classical processor 1150 can be used to perform classical computation operations described in this specification according to some implementations, e.g., the classical machine learning methods described herein.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. An apparatus comprising:
   a qubit, wherein the state of the qubit occupies at least one of a plurality of levels, the plurality of levels comprising two computational levels and one or more non-computational levels that are each higher in energy than the computational levels;
   a resonator, wherein the resonator operates at a resonator frequency;
   a control electronics configured to control an operating frequency of the qubit such that during a reset operation the operating frequency of the qubit is adjusted from a holding frequency to an idling frequency, wherein
      the holding frequency is lower than the resonator frequency and the idling frequency is higher than the resonator frequency, and
      a first derivative of the qubit operating frequency at a first time during the adjustment is positive, and at a second time during the adjustment that occurs after the first time is zero, and at a third time during the adjustment that occurs after the second time is positive, and wherein the operating frequency of the qubit achieves the idling frequency at a fourth time that occurs after the third time.

2. The apparatus of claim 1, wherein adjusting the operating frequency of the qubit causes destructive interference between the qubit and resonator.

3. The apparatus of claim 1, wherein a first derivative of the qubit operating frequency at a fifth time during the adjustment is negative, wherein the fifth time occurs after the second time and before the third time.

4. The apparatus of claim 3, wherein a first derivative of the qubit operating frequency at a sixth time during the adjustment is zero, wherein the sixth time occurs after the fifth time and before the third time.

5. The apparatus of claim 4, wherein the adjustment of the operating frequency of the qubit is defined by two tunable parameters from a set of multiple parameters.

6. The apparatus of claim 5, wherein the set of multiple parameters comprises a first parameter that represents a value of the operating frequency of the qubit at the second time, wherein the value of the first parameter is greater than or equal to the resonator frequency and less than or equal to the idling frequency.

7. The apparatus of claim 5, wherein the set of multiple parameters comprises a second parameter that represents a value of the operating frequency of the qubit at the sixth time, wherein the value of the second parameter is greater than or equal to the holding frequency and less than the idling frequency.

8. The apparatus of claim 5, wherein the set of multiple parameters comprises a third parameter that represents a duration between the second time and the fourth time.

9. The apparatus of claim 5, wherein the set of multiple parameters comprises a fourth parameter that represents a smoothness of the adjustment of the qubit operating frequency between one or more of i) the second time and the sixth time or ii) the sixth time and the fourth time.

10. The apparatus of claim 1, wherein during the reset operation the control electronics is further configured to:
   adiabatically adjust the qubit operating frequency from i) a current operating frequency to ii) the holding frequency to transfer qubit excitations to the resonator; and
   hold the qubit operating frequency at the holding frequency such that resonator excitations decay.

11. The apparatus of claim 1, wherein prior to the reset operation the qubit occupies a non-computational level and after the reset operation the qubit occupies a ground state included in the two computational levels.

12. The apparatus of claim 1, wherein the reset operation is repeatedly performed after each of multiple rounds of quantum error correction.

13. A method for resetting a qubit, the method comprising:
   controlling, by a quantum computing system, an operating frequency of a qubit, wherein i) the qubit is coupled to a resonator operating at a resonator frequency and ii) the state of the qubit occupies at least one of a plurality of levels, the plurality of levels comprising two computational levels and one or more non-computational levels that are each higher in energy than the computational levels, the controlling comprising, during a reset operation:
      adjusting the operating frequency of the qubit from a holding frequency to an idling frequency, wherein i) the holding frequency is lower than the resonator frequency and the idling frequency is higher than the resonator frequency, and ii) a first derivative of the qubit operating frequency at a first time during the adjustment is positive, and at a second time during the adjustment that occurs after the first time is zero, and at a third time during the adjustment that occurs after the second time is positive, and wherein the operating frequency of the qubit achieves the idling frequency at a fourth time that occurs after the third time.

14. The method of claim 13, wherein adjusting the operating frequency of the qubit causes destructive interference between the qubit and resonator.

15. The method of claim 13, wherein a first derivative of the qubit operating frequency at a fifth time during the adjustment is negative, wherein the fifth time occurs after the second time and before the third time.

16. The method of claim 15, wherein a first derivative of the qubit operating frequency at a sixth time during the adjustment is zero, wherein the sixth time occurs after the fifth time and before the third time.

17. The method of claim 16, wherein the adjustment of the operating frequency of the qubit is defined by two tunable parameters from a set of multiple parameters.

18. The method of claim 17, wherein the set of multiple parameters comprises a first parameter that represents a value of the operating frequency of the qubit at the second time, wherein the value of the first parameter is greater than or equal to the resonator frequency and less than or equal to the idling frequency.

19. The method of claim 17, wherein the set of multiple parameters comprises a second parameter that represents a value of the operating frequency of the qubit at the sixth time, wherein the value of the second parameter is greater than or equal to the holding frequency and less than the idling frequency.

20. The method of claim 17, wherein the set of multiple parameters comprises a third parameter that represents a duration between the second time and the fourth time.

21. The method of claim 17, wherein the set of multiple parameters comprises a fourth parameter that represents a smoothness of the adjustment of the qubit operating frequency between one or more of i) the second time and the sixth time or ii) the sixth time and the fourth time.

22. The method of claim 13, wherein the controlling further comprises, during the reset operation:
adiabatically adjusting the qubit operating frequency from i) a current operating frequency to ii) the holding frequency to transfer qubit excitations to the resonator; and
holding the qubit operating frequency at the holding frequency such that resonator excitations decay.

23. The method of claim 13, wherein prior to the reset operation the qubit occupies a non-computational level and after the reset operation the qubit occupies a ground state included in the two computational levels.

24. The method of claim 13, further comprising repeatedly performing the reset operation after each of multiple rounds of quantum error correction.

25. The method of claim 13, further comprising calibrating the adjustment of the qubit operating frequency with respect to a first tunable parameter and a second tunable parameter, the calibrating comprising:
performing a first set of qubit reset operations, wherein each qubit reset operation in the first set corresponds to respective values of the first tunable parameter and the second tunable parameter;
identifying, based on reset errors corresponding to the first set of qubit reset operations, an initial value of the first tunable parameter and an initial value of the second tunable parameter;
performing a second set of qubit reset operations, wherein each qubit reset operation in the second set corresponds to respective values of the first tunable parameter and the second tunable parameter that are within a predetermined distance from the initial value of the first tunable parameter and the initial value of the second tunable parameter; and
identifying, based on reset errors corresponding to the second set of qubit reset operations, an optimal value of the first tunable parameter and an optimal value of the second tunable parameter.

* * * * *